US008649249B1

(12) United States Patent
Schreck et al.

(10) Patent No.: US 8,649,249 B1
(45) Date of Patent: Feb. 11, 2014

(54) PRINTING MAGNETIC PATTERN ONTO DISK

(75) Inventors: Erhard Schreck, San Jose, CA (US);
David Fowler, San Jose, CA (US);
Michael Mallary, Sterling, MA (US)

(73) Assignee: Seagate Technology LLC, Cupertino, CA (US)

( * ) Notice: Subject to any disclaimer, the term of this patent is extended or adjusted under 35 U.S.C. 154(b) by 1067 days.

(21) Appl. No.: 11/220,068

(22) Filed: Aug. 31, 2005

Related U.S. Application Data

(60) Provisional application No. 60/606,870, filed on Sep. 2, 2004.

(51) Int. Cl.
*G11B 9/00* (2006.01)
*G11B 7/00* (2006.01)

(52) U.S. Cl.
USPC ............... 369/126; 369/100; 360/15; 360/59

(58) Field of Classification Search
USPC ............... 369/13.03; 360/15–17, 29
See application file for complete search history.

(56) References Cited

U.S. PATENT DOCUMENTS

| | | | | |
|---|---|---|---|---|
| 5,396,483 | A | * | 3/1995 | Matsuda et al. ............. 369/283 |
| 6,587,408 | B1 | * | 7/2003 | Jacobson et al. ........... 369/44.16 |
| 6,738,205 | B1 | | 5/2004 | Moran et al. |
| 6,795,630 | B2 | * | 9/2004 | Challener et al. ............. 385/129 |
| 6,813,106 | B1 | | 11/2004 | Mallary |
| 6,879,458 | B2 | | 4/2005 | Sacks et al. |
| 2002/0110074 | A1 | * | 8/2002 | Gibson ........................ 369/101 |
| 2003/0035235 | A1 | * | 2/2003 | Ikeda et al. .................... 360/59 |
| 2003/0076612 | A1 | * | 4/2003 | Sacks et al. .................... 360/59 |
| 2003/0082395 | A1 | | 5/2003 | Mallary |
| 2004/0001394 | A1 | * | 1/2004 | Challener et al. ........... 369/13.32 |
| 2004/0027728 | A1 | * | 2/2004 | Coffey et al. ................. 360/313 |
| 2004/0100709 | A1 | | 5/2004 | Mallary |
| 2005/0047283 | A1 | * | 3/2005 | Ruigrok ..................... 369/13.14 |
| 2005/0052984 | A1 | * | 3/2005 | Hong et al. .................. 369/126 |
| 2005/0128621 | A1 | | 6/2005 | Ehrlich |

OTHER PUBLICATIONS

Bain, James, "Field emission probe recording" The Data Storage Systems Center (DSSC), <http://www.ece.cmu.edu/research/dssc/research/project_list/show/99>, 2005.
Zhang, Li et al., "A Model for Mark Size Dependence on Field Emission Voltage in Heat-Assisted Magnetic Probe Recording on CoNi/Pt Multilayers", IEEE Transactions on Magnetics, vol. 40 No. 4, pp. 2549-2551, Jul. 2004.

* cited by examiner

*Primary Examiner* — Joseph Feild
*Assistant Examiner* — Carl Adams
(74) *Attorney, Agent, or Firm* — Hollingsworth Davis, LLC

(57) ABSTRACT

A novel method and apparatus is provided for printing magnetic patterns using heat assisted magnetic recording (HAMR). The apparatus includes an array of probes that is arranged in a predetermined pattern, such as a servo pattern. The array of probes is brought into contact, or near-contact, with a magnetic recording medium that has been bulk erased substantially along an initialization direction. Each probe is energized so as to heat its respective contacted (or near-contacted) region of the recording medium above a threshold temperature. An external magnetic field is applied to the heated regions in a direction that is substantially opposite from the initialization direction. The strength of the external magnetic field is chosen to be greater than the coercivity of the recording medium at the threshold temperature, but less than the coercivity of the recording medium at room temperature. As a result, only magnetizations in the heated regions become aligned with the external field.

23 Claims, 8 Drawing Sheets

PRINTING MAGNETIC PATTERN ONTO DISK

CROSS-REFERENCE TO RELATED APPLICATION

The present application claims the benefit of U.S. Provisional Patent Application Ser. No. 60/606,870, entitled Printing Magnetic Pattern Onto Disk, which provisional patent application was filed on Sep. 2, 2004 by Schreck et al. and is hereby incorporated by reference as though fully set forth herein.

FIELD OF THE INVENTION

This invention relates generally to writing magnetic patterns on magnetic recording media and, more specifically, to a novel technique for using an array of probes to print a magnetic pattern on the media using heat assisted magnetic recording (HAMR).

BACKGROUND INFORMATION

A conventional magnetic recording disk typically contains servo patterns written in preselected regions ("servo sectors") on the disk surface. The servo patterns provide position and tracking information during a readout process. For instance, each servo pattern may store information that enables a read head to determine its relative position on the disk surface. In addition, the servo pattern also may be configured to cause the read head to generate a position error signal when it reads the servo pattern. The position error signal is then fed back to a controller that controls the head's tracking.

The servo patterns are typically written on the magnetic recording disk during a disk-manufacturing process, e.g., in a clean room environment. There are various known techniques for writing the servo patterns on the disk. One common technique is to program a magnetic write head to write the servo patterns as the disk rotates beneath the head. This technique, although effective, sequentially writes the individual patterns onto the disk and thus can be overly time-consuming, e.g., taking up to six hours or more to complete.

Moreover, in many cases the servo patterns include marks that are intentionally misaligned with the disk's concentric recording tracks. For example, a servo pattern may include at least some "off-track" marks that are used to generate the position error signal. In these cases, the write head must be precisely positioned relative to the recording tracks, e.g., using laser interferometry or the like, to ensure that the head can write magnetic transitions at their expected off-track locations. Because of the strict tolerances required for positioning the write head while writing servo patterns, this servo-writing technique usually suffers the disadvantage of having to expend considerable time and resources setting up and configuring complex and expensive head-positioning instrumentation.

Another known technique for writing servo patterns utilizes magnetic printing. A printing master is constructed having a plurality of ferromagnetic "teeth" that are constructed and arranged to coincide with at least one servo pattern. According to this technique, a magnetic recording disk is first subjected to a strong magnetic field that substantially saturates the disk along an initialization direction. The initializing field is removed and then the printing master is positioned so that its teeth are placed in contact with the disk surface at one or more servo sectors. After positioning the printing master, the pattern of the ferromagnetic teeth is transferred to the disk surface by applying a writing field in a direction that is substantially opposite to the initialization direction. The teeth may be used either to shield their contacted disk surfaces from the applied writing field (e.g., longitudinal recording), or alternatively to concentrate magnetic flux at their contacted surfaces (e.g., perpendicular recording). In either case, a copy of the teeth pattern is written onto the disk after the printing master is removed.

Contact printing for longitudinal media is generally described in more detail in U.S. Pat. No. 6,813,106, entitled Premagnetization Process for Printing Longitudinal Media, by Michael Mallary, issued Nov. 2, 2004; contact printing for perpendicular media is generally described in more detail in U.S. Patent Application Publication No. US 2003/0082395, entitled Master for Printing Servo Patterns, by Michael Mallary, published May 1, 2003.

The above-noted servo-writing technique provides various advantages over conventional head-based servo writers, especially with respect to the speed with which the servo patterns are written. However, during the magnetic printing process, stray fields between the ferromagnetic teeth often limit their ability to write high-frequency servo patterns. That is, if the ferromagnetic teeth are spaced too close together, they may not be able to effectively shield or concentrate these stray interstitial fields. Accordingly, the ferromagnetic teeth are limited to transferring magnetic mark sizes above a minimum feature size, e.g., on the order of hundreds of nanometers, before the undesirable effects of the stray fields become prohibitive.

Yet another known technique for writing servo patterns employs laser light to transfer the patterns to disk using heat assisted magnetic recording (HAMR). Like the other techniques, the disk is initially saturated substantially along an initialization direction. Thereafter, incident light is focused at selected areas on the disk surface to produce a pattern of heated areas corresponding to the servo patterns, and an external magnetic field is applied to the heated areas in a direction that is substantially opposite to the initialization direction. The strength of the applied field is selected to be greater than the coercivity of the heated (irradiated) areas of the disk media, yet less than the coercivity of the unheated media. As such, the applied field only reverses those magnetic domains in the heated regions, thereby copying the servo patterns to the disk. One example of HAMR-based servo-writing is described in more detail in U.S. Pat. No. 6,879,458, entitled Method for Thermally Writing Servo Patterns on Magnetic Media, by Sacks et al., issued Apr. 12, 2005.

While the minimum feature size that can be written using HAMR-based approaches is typically limited by the diffraction-limited spot size of the incident light, the resolution may be improved by utilizing an optical shadow mask having a pattern of holes constructed and arranged to coincide with at least one servo pattern. The shadow mask may be placed in close proximity to the surface of the disk and aligned with one or more of the disk's servo sectors. When the incident laser light is applied to the mask, the light passes through the holes and irradiates the exposed areas of the disk surface. For small hole sizes, there exists a trade-off between reducing the hole sizes, e.g., below the diffraction-limited spot size, and increasing the power of the incident light to heat the exposed disk media. As a result of this trade-off, the minimum feature sizes that can be written to disk through the optical mask is typically limited, e.g., to magnetic domains on the order of hundreds of nanometers.

For high-density servo patterns, smaller feature sizes are generally desired. Accordingly, there is a need for an improved technique for writing servo patterns on magnetic recording media. The technique should enable faster and less complex writing processes as compared with conventional head-based servo writers. In addition, the technique should be less limited in its minimum feature sizes as compared with current optical and contact servo-writing techniques.

SUMMARY OF THE INVENTION

The present invention overcomes the disadvantages of the prior art by providing a novel method and apparatus for printing magnetic patterns using heat assisted magnetic recording (HAMR). The apparatus includes an array of probes that is arranged in a predetermined pattern, such as a servo pattern. In practice, the array of probes is brought into contact, or near-contact, with a magnetic recording medium that has been bulk erased substantially along an initialization direction. Each probe is energized so as to heat its respective contacted (or near-contacted) region of the recording medium above a threshold temperature. In this manner, the probe pattern is reproduced on the recording medium as a pattern of heated regions. An external magnetic field, or "printing" field, is applied to the heated regions in a direction that is substantially opposite from the initialization direction. The strength of the printing field is chosen to be greater than the coercivity of the recording medium at the threshold temperature, but less than the coercivity of the recording medium at room temperature. As a result, only magnetizations in the heated regions become aligned with the printing field after the probe-based apparatus is removed and the recording medium cools.

In a first illustrative embodiment, the apparatus includes an array of light-guiding probes that concentrates incident light at the tips of the probes. Each probe essentially functions as a waveguide that directs a portion of the incident light to its tip. The array of probes may be illuminated at substantially the same time or, alternatively, the light source may be scanned one or more times across the array. In practice, the array is positioned so that light exiting each probe tip heats a localized region of the magnetic recording medium situated directly beneath the tip. The power of the incident light is selected to ensure that enough light exits the respective probe tips to heat the localized regions of the recording medium above the threshold temperature. The probes are preferably positioned within the optical near field relative to the surface of the recording medium. As such, the diameters of the probe tips can be less than the wavelength(s) of the incident light and no external lenses are needed.

In a second illustrative embodiment, the apparatus includes an array of currentemitting probes fabricated from an electrically conductive material. A voltage is applied between the array of probes and the magnetic recording medium to induce current flow from the probes to the recording medium. Each probe's emitted current heats a localized region of the recording medium situated directly beneath the probe. The amplitude and duration of the applied voltage are selected to ensure that the emitted currents heat their respective localized regions of the recording medium above the threshold temperature without physically damaging the medium. When the probes are placed in contact with the recording medium, the applied voltage may induce either direct or alternating currents (DC or AC). Alternatively, if the probes are positioned in close proximity to the medium, the applied voltage may induce electrostatic discharge (ESD) events that generate field-emission currents from the probes to the recording medium.

The novel probe-based method and apparatus offers various advantages over previous techniques for writing magnetic patterns onto magnetic recording media. For instance, unlike traditional head-based servo writers that write one magnetic domain at a time, the probe-based apparatus can write a plurality of magnetic domains at substantially the same time. In addition, since individual probe tips can be fabricated, e.g., using electron-beam lithography, to be smaller than the minimum feature sizes of conventional optical and contact-printing solutions, the novel apparatus can print higher-resolution magnetic patterns than the conventional solutions. These and other advantages will be apparent based on the following detailed description and claims set forth herein.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

Figure 1:
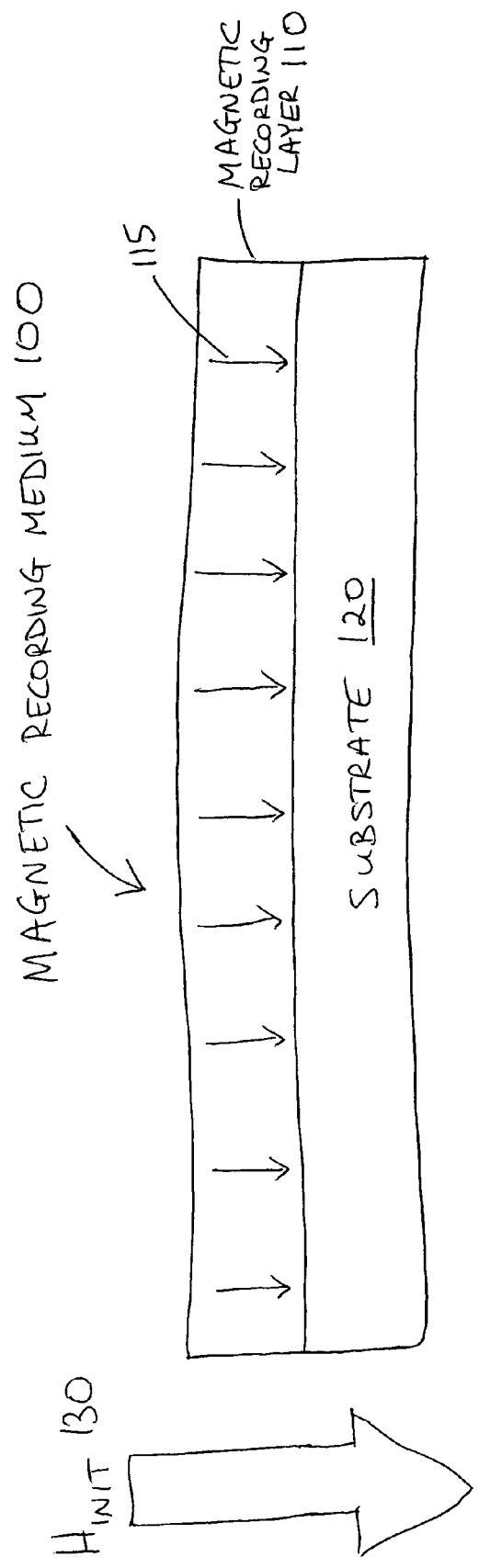
FIG. 1 is a schematic diagram of an exemplary magnetic recording medium, such as a magnetic disk, that advantageously may be used in accordance with the illustrative embodiments.

FIG. 1 illustrates an exemplary magnetic recording medium 100, such as a magnetic disk, that advantageously may be used in accordance with the illustrative embodiments. The recording medium 100 includes, among other things, a magnetic recording layer 110 deposited on a substrate 120. The recording medium also may contain other magnetic or non-magnetic layers, such as a soft magnetic underlayer, exchange-coupled layer, lubrication layer, carbon overcoat, etc., which are not explicitly shown. The magnetic recording layer 110 is a hard magnetic material having relatively large coercivity and uniaxial anisotropy at room temperature. The recording layer may be fabricated using various ferromagnetic materials and alloys, e.g., embodied as thin-film or particulate media, and may be deposited on the substrate 120 using a variety of deposition techniques known in the art. The substrate also may be constructed from various materials, such as glass or conventional aluminum-magnesium substrates used for magnetic disks.

Information can be stored in the magnetic recording layer 110 by selectively aligning its magnetizations 115 in different directions along an anisotropy axis. Although the exemplary recording layer is shown having a perpendicular anisotropy, it is expressly contemplated that the recording layer alternatively may contain longitudinally-oriented magnetizations. According to the illustrative embodiments, an external magnetic "initialization" field $H_{INIT}$ 130 is applied to the magnetic recording layer 110 before a magnetic pattern, such as a servo pattern, may be written thereon. Specifically, the applied field 130 saturates the recording layer in an initialization direction that is chosen to be parallel with the anisotropy axis. As a result, the magnetic recording layer 110 is essentially uniformly magnetized (DC-erased) in the initialization direction. As shown in the drawing, the illustrative magnetic field $H_{INIT}$ 130 substantially aligns the magnetizations 115 in a downward direction.

The present invention provides a novel method and apparatus for printing magnetic patterns onto the initialized magnetic recording layer 110 using heat assisted magnetic recording (HAMR). To that end, a mask containing an array of probes is brought into contact, or near-contact, with the initialized recording layer, as discussed in more detail below with reference to FIGS. 2-8. The mask is preferably constructed and arranged so that its array of probes corresponds to one or more servo patterns. Each probe is energized so as to heat its contacted (or near-contacted) region of the recording layer above a threshold temperature. In this manner, the pattern of the probes is transferred to the magnetic recording layer 110 as a pattern of heated regions. An external magnetic field, or "printing" field, is applied to the heated regions in a direction that is substantially opposite from the initialization direction. The strength of the printing field is chosen to be greater than the coercivity of the recording layer 110 at the threshold temperature, but less than the recording layer's coercivity at room temperature, i.e., ambient temperature. As a result, only magnetizations in the heated regions become aligned with the printing to field after the probes are removed and the recording layer cools.

Figure 2:
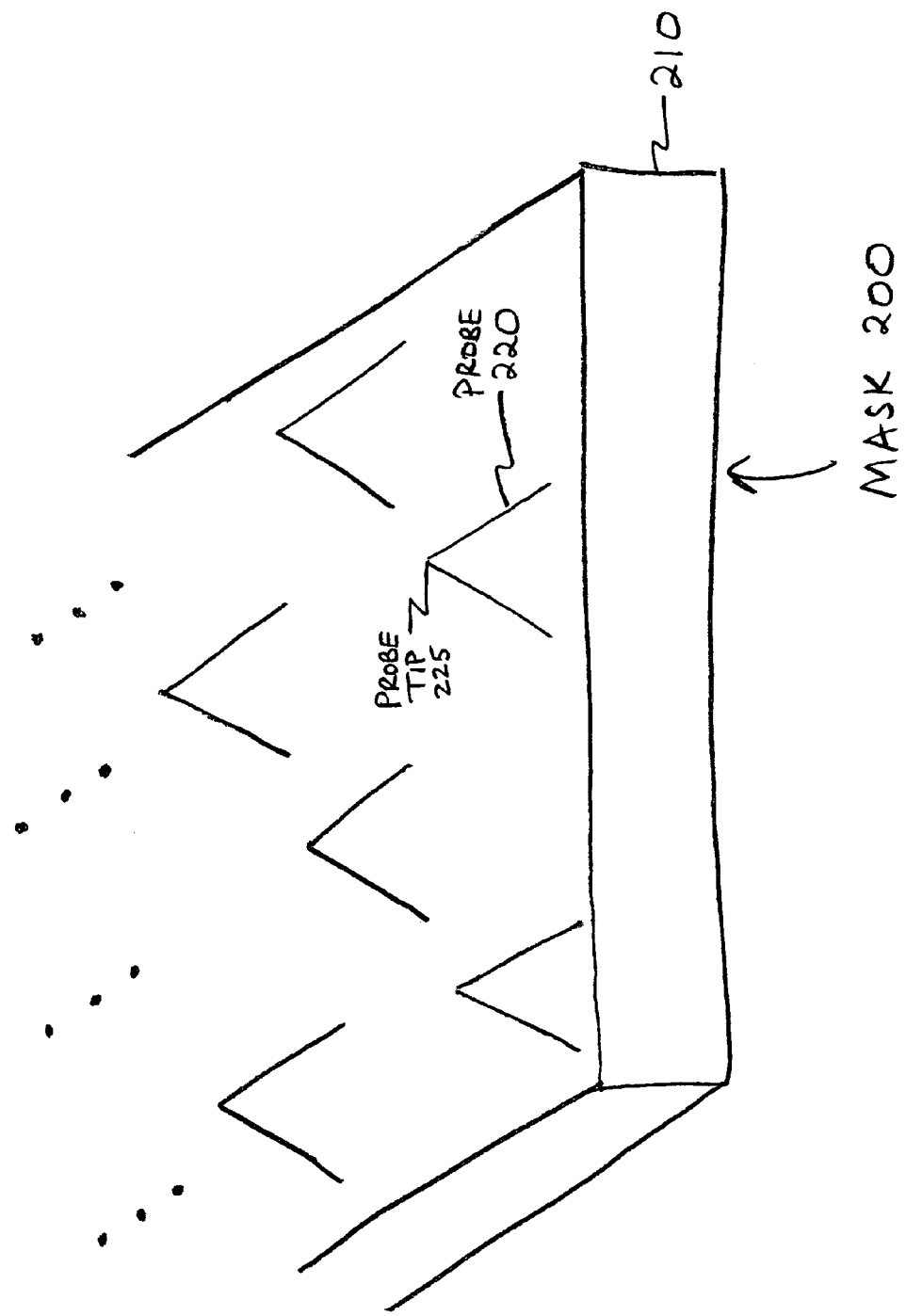
FIG. 2 is a schematic diagram of an exemplary mask containing an array of probes that may be used to print magnetic patterns in accordance with the invention.

FIG. 2 illustrates an exemplary mask 200 that may be used to print magnetic patterns in accordance with the illustrative embodiments. The mask is reusable and may be used to print the same magnetic pattern on a large number of magnetic recording media, e.g., in a disk manufacturing process. The mask 200 includes a base portion 210 on is which an array of probes 220 may be arranged in a predetermined pattern, such as a servo pattern. Each probe 220 is generally constructed as a fine "tip," preferably having a similar shape as conventional tips used for, e.g., atomic-force microscopy (AFM) or scanning-tunneling microscopy (STM). Although the probe tips 225 may be fabricated as small as atomic dimensions, the size of each probe tip is preferably selected to be equal to or less than the dimensions of the magnetic domains that the probe writes in a magnetic printing process.

The mask 200 may be constructed from various materials, including electrical insulators, semiconductors or metals or ferromagnetic materials, and the probes 220 may be fabricated in a variety of different ways consistent with the choice of materials. For example, in the case of a polymer mask 200, the probes 220 may be formed via an injection molding process. For metallic masks, the probes may be formed by etching a metallic base 210 using selective etching techniques, such as focused ion etching, reactive ion etching, chemical ("wet") etching or the like. In a preferred embodiment, the probes 220 are fabricated using conventional electron-beam lithography techniques known in the art for creating fine tip structures. The base 210 and the probes 220 may be constructed using the same or different materials. Those skilled in the art will also appreciate that the base 210 and the probes 220 may be separated by one or more intermediate layers (not shown) and/or may be coated with one or more outer layers (not shown), such as protective layers, dielectric layers, oxide layers, etc.

In a first illustrative embodiment, the mask includes an array of light-guiding probes that concentrates incident light at their tips. Each probe essentially functions as a waveguide that directs a portion of the incident light to its tip. The array of probes may be illuminated at substantially the same time or, alternatively, the light source may be raster scanned one or more times across the array. In practice, the array is positioned so to that light exiting each probe tip heats a localized region of the magnetic recording layer situated directly beneath the tip. The power of the incident light is selected to ensure that enough light exits the respective probes to heat the localized regions of the recording medium above a threshold temperature. The probes are preferably positioned within the optical near field relative to the surface of the recording medium. As such, the diameters of the probe tips can be less than the wavelength(s) of the incident light and no external lenses are needed.

Figure 3:
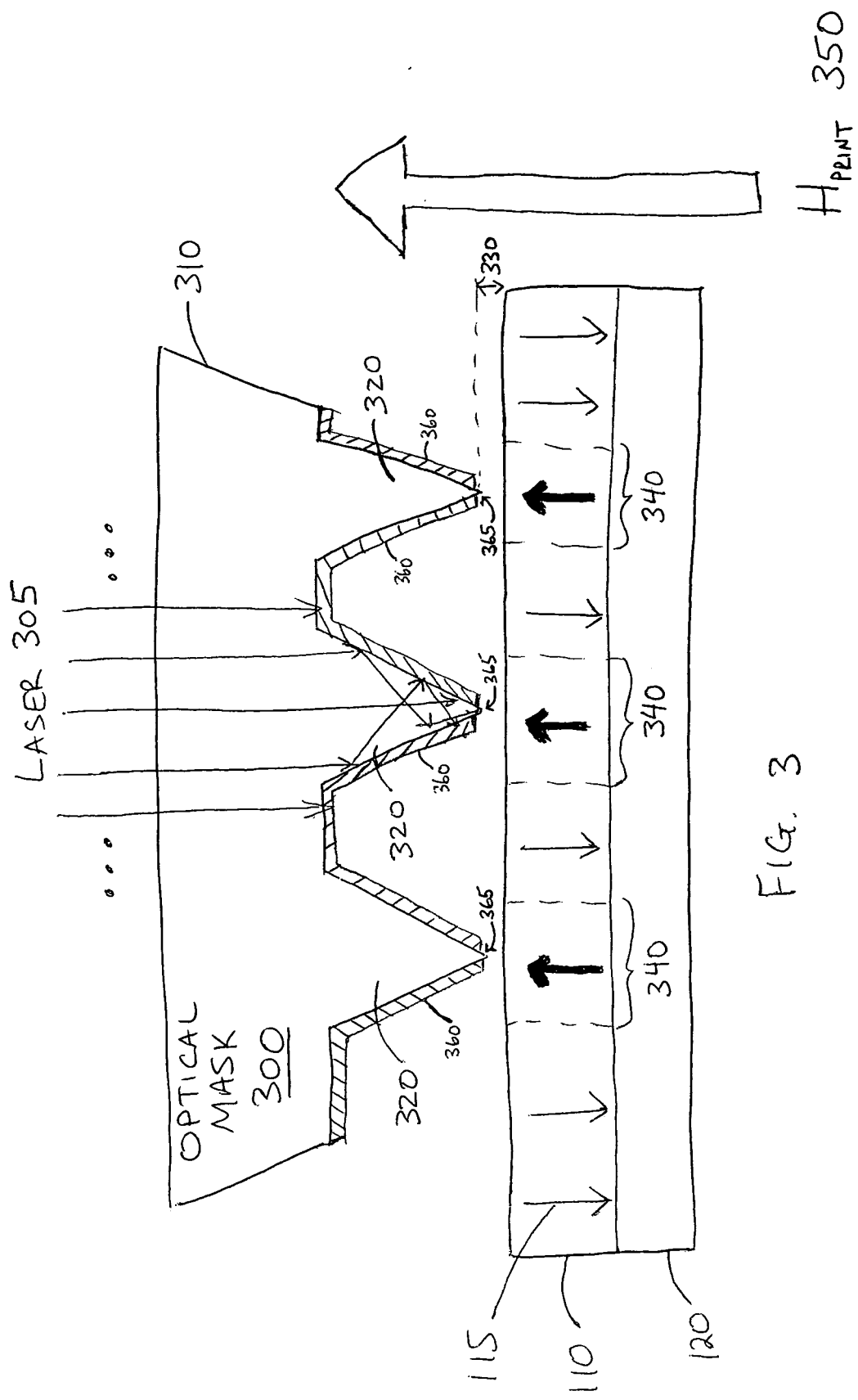
FIG. 3 is a schematic diagram of an exemplary optical mask that may be used to print magnetic patterns on a magnetic recording medium in accordance with a first illustrative embodiment.

FIG. 3 illustrates an exemplary mask 300 that may be constructed from an optically transparent material, such as glass or plastic. More specifically, the base 310 and probes 320 are transparent to at least one or more wavelengths of incident laser light 305, and preferably the base and probes are fabricated from the same optical material(s). In operation, the optical mask 300 is brought into contact, or near contact, with the initialized magnetic recording layer 110. Preferably, the mask is positioned so that its probe tips are situated within a relatively small distance 330 with respect to the surface of the magnetic recording layer 110, thereby ensuring that light emitted from the probe tips is within the optical near field. When the optical mask is used to print one or more servo patterns, the probes 320 may have to be aligned with at least one servo sector on the recording layer 110.

After positioning the optical mask 300, incident laser light 305 is directed through the mask's base portion 310 and into the probes 320. Within each probe, the light is reflected internally and eventually concentrated at the probe's tip. To improve the efficiency with which light is reflected within the probes, the outer surface of the probes may be coated with one or more reflective or dielectric layers, as long as each reflective or dielectric layer includes apertures or transmissive portions that allow light to exit the tips of the probes. For example, as shown in FIG. 3, a reflective ferromagnetic film 360 with pin holes 365 positioned at the probe tips may cover the bottom surface of the optical mask 300 in order to magnify the applied printing field 350 and confine the emitted laser light to the tip regions. The light emitted from each probe heats a corresponding region 340 of the recording layer above a threshold temperature, which may be above or below the Curie temperature of the magnetic recording layer 110. At the threshold temperature and above, the heated regions 340 have a reduced coercivity as compared with the coercivity of the recording layer at room temperature.

A magnetic field $H_{PRINT}$ 350 is applied in a direction that is substantially the opposite of the initialization direction of the magnetic recording layer 110. For example, as shown, since the magnetizations 115 in the recording layer have been initialized in a downward direction (FIG. 1), the field $H_{PRINT}$ is applied in an upward direction. The strength of the applied field 350 is selected to be greater than the coercivity of the heated regions 340 but less than the coercivity of the recording layer 110 at room temperature. As a result, only those magnetizations (shown in bold) in the heated regions 340 change direction and align with the printing field 350. Because the diameters of the optical probe tips can be fabricated below the wavelength(s) of the incident light 305, it is expected that each probe 320 can write magnetic domains as small as 20 nanometers in the recording layer 110.

Figure 4:
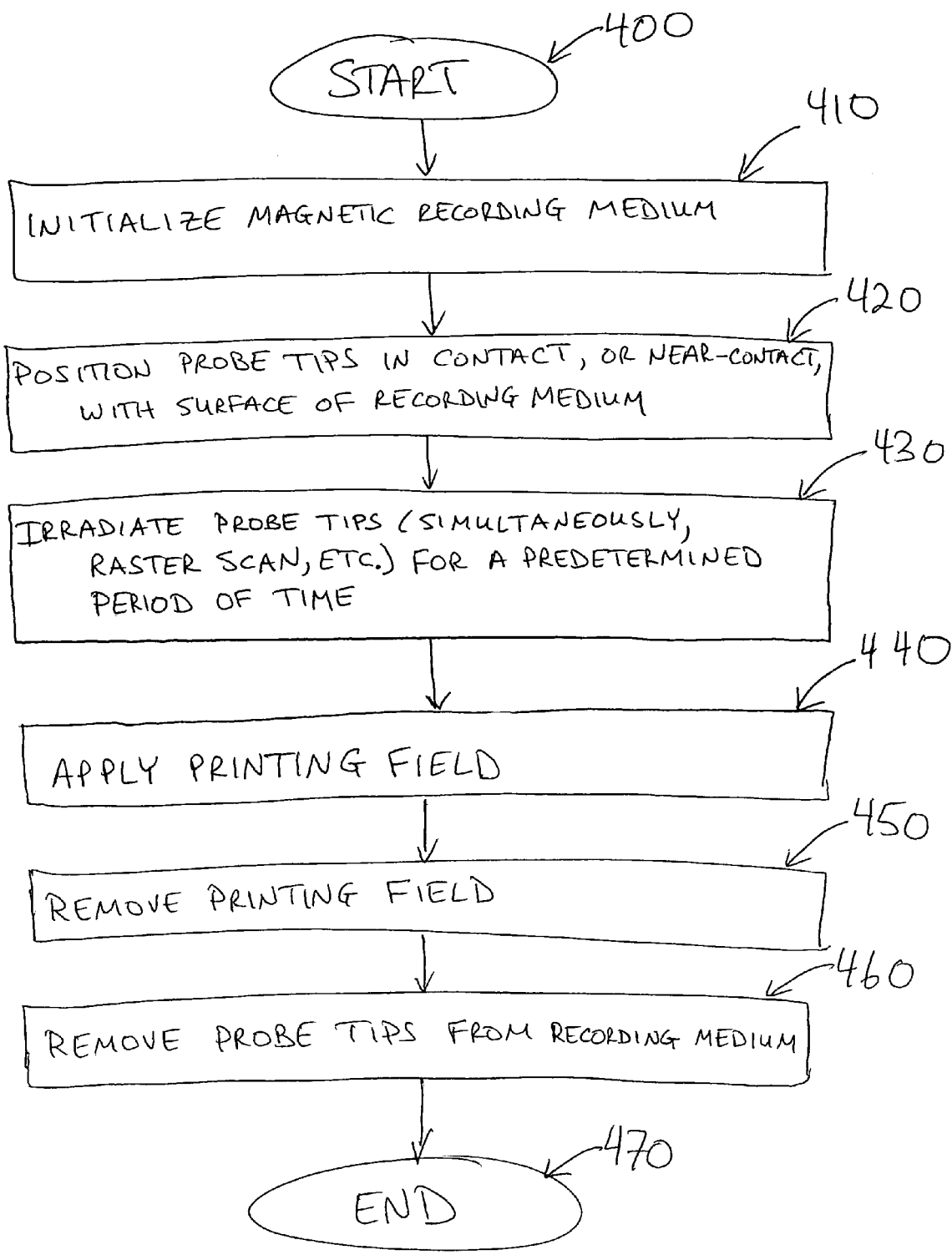
FIG. 4 is a flowchart illustrating a sequence of steps for printing a magnetic pattern using the optical mask of FIG. 3.

FIG. 4 illustrates a sequence of steps that may be performed for printing a magnetic pattern using the optical mask 300. The sequence starts at step 400 and proceeds to step 410 where the magnetic recording medium 100 is bulk erased in an initialization direction, e.g., by a strong initializing field $H_{INIT}$ 130. At step 420, the mask is positioned so that its array of probes are placed in contact, or near contact, with the surface of the initialized recording medium. At step 430, the probes 320 are irradiated for a predetermined period of time in order to generate a sufficient amount of energy at their tips to heat localized regions 340 of the recording medium above a threshold temperature. Then, at step 440, a printing field $H_{PRINT}$ 350 is applied in a direction that is substantially the opposite of the initialization direction.

The threshold temperature corresponds to a temperature at which the coercivity of the recording medium is less than the strength of the printing field 350, thus enabling the printing field to reverse the magnetization directions in the heated regions 340. The probes may be irradiated by applying incident laser light simultaneously to the probe array, or alternatively may involve irradiating one or more probe tips at a time, e.g., such as by repeated raster scanning or the like. At step 450, the printing field 350 is removed and then the probes are moved away from the recording medium at step 460. The sequence ends at step 470.

In a second illustrative embodiment, the mask includes an array of currentemitting probes which are fabricated from an electrically conductive material that also may be ferromagnetic. A voltage is applied between the array of probes and the magnetic recording layer to induce current flow from the probes to the recording layer. The amplitude and duration of the applied voltage are selected such that the emitted probe currents heat localized regions of the recording medium above a threshold temperature without physically damaging the medium. When the probes are placed in contact with the magnetic recording layer, the applied voltage may be constant or time-varying to induce either direct or alternating currents (DC or AC) through the probes. Alternatively, if the probes are positioned in close proximity to the medium, the applied voltage may induce electrostatic discharge (ESD) events that generate field-emission currents from the probes to the recording layer.

Figure 5:
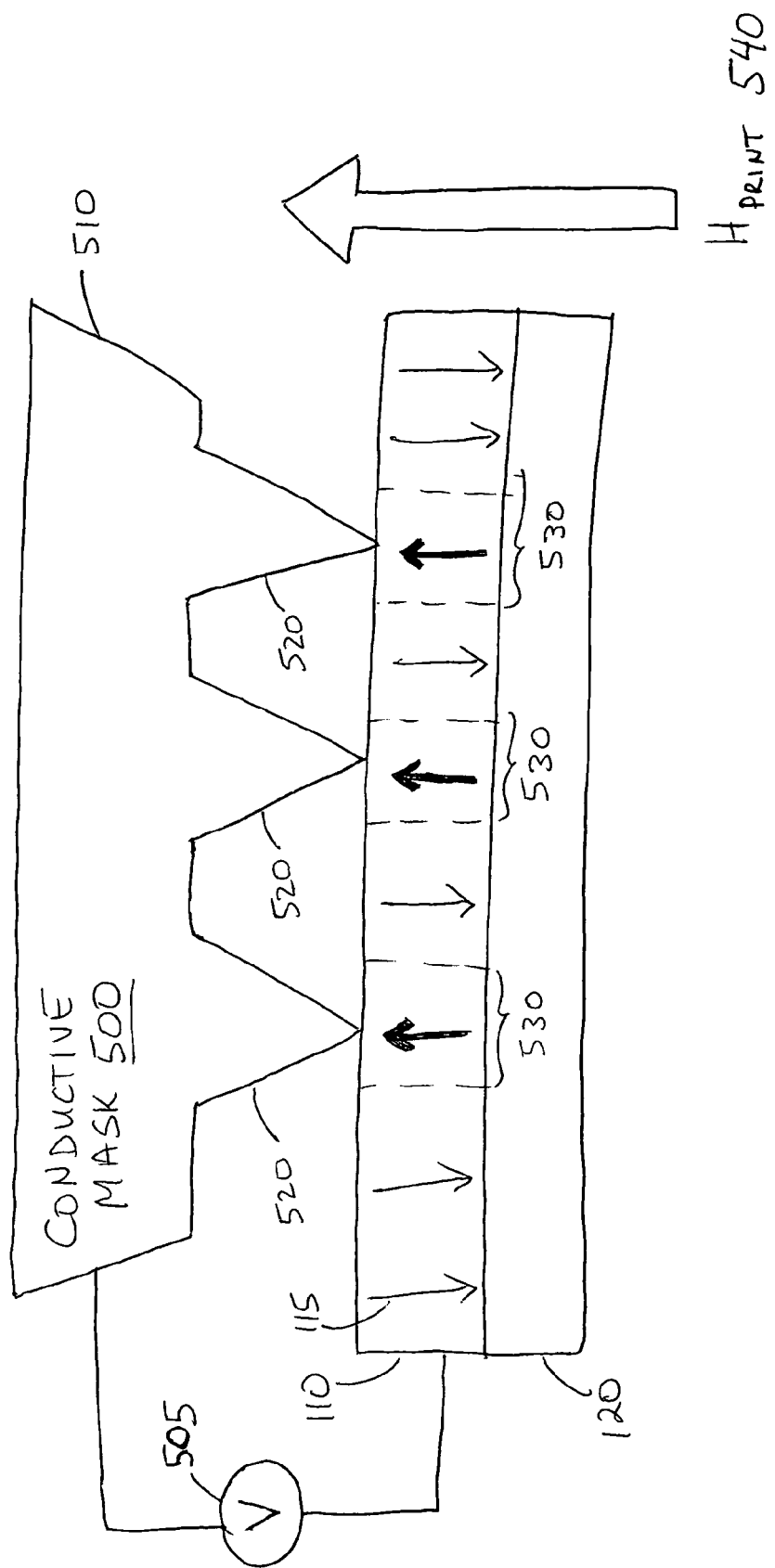
FIG. 5 is a schematic diagram of an exemplary electrically conductive mask that may be used to print magnetic patterns on a magnetic recording medium in accordance with a second illustrative embodiment.

FIG. 5 illustrates an exemplary mask 500 that may be constructed from an electrically conductive material, such as a ferromagnetic metal or other metal, a semiconductor or alloys thereof. The mask's base 510 and probes 520 are preferably fabricated from the same conductive material. The mask is positioned so that its probes are placed in contact with the surface of an initialized magnetic recording layer 110. If the mask is configured to write one or more servo patterns, the probes may have to be aligned with at least one servo sector on the recording layer.

After positioning the conductive mask 500, a voltage 505 is applied between the mask and the magnetic recording layer to induce a current flow through the probes to the underlying recording layer, or vice versa. The applied voltage may be constant or time-varying, and therefore may induce either a DC or AC current through each probe. Further, the voltage may be applied to all of the probes at substantially the same time or, alternatively, may be sequentially applied to selected subsets of one or more probes. The current passing through each probe 520 heats the probe's contacted region 530 above a threshold temperature, e.g., due to Joule heating (resistive power loss) at the contact point. At the threshold temperature and above, the heated regions 530 have a reduced coercivity as compared with the coercivity of the recording layer at ambient temperature. The threshold temperature may be above or below the Curie temperature of the magnetic recording layer.

The applied voltage 505 is preferably embodied as one or more voltage pulses whose amplitude and duration are selected to heat the regions 530 above the threshold temperature without physically damaging, e.g., melting or ablating, the recording layer material. Illustratively, each voltage pulse may generate a corresponding probe current of less than approximately 100 milliamperes for a time period on the order of a nanosecond. More generally, the amplitude and duration of the voltage pulse(s) are selected so that the regions 530 are heated above the threshold temperature while minimizing thermal diffusion effects at their boundaries. Accordingly, those skilled in the art will appreciate that different voltage pulse-widths and amplitudes may be employed for different recording layer and substrate materials, e.g., depending on their electrical and thermal properties.

A magnetic printing field $H_{PRINT}$ 540 is applied in a direction that is substantially opposite from the initialization direction of the recording layer 110. The strength of the applied field 540 is selected to be greater than the coercivity of the heated regions 530 but less than the coercivity of the recording layer 110 at room temperature. As a result, only those magnetizations (shown in bold) in the heated regions 530 change direction and align with the printing field 540.

Figure 6:
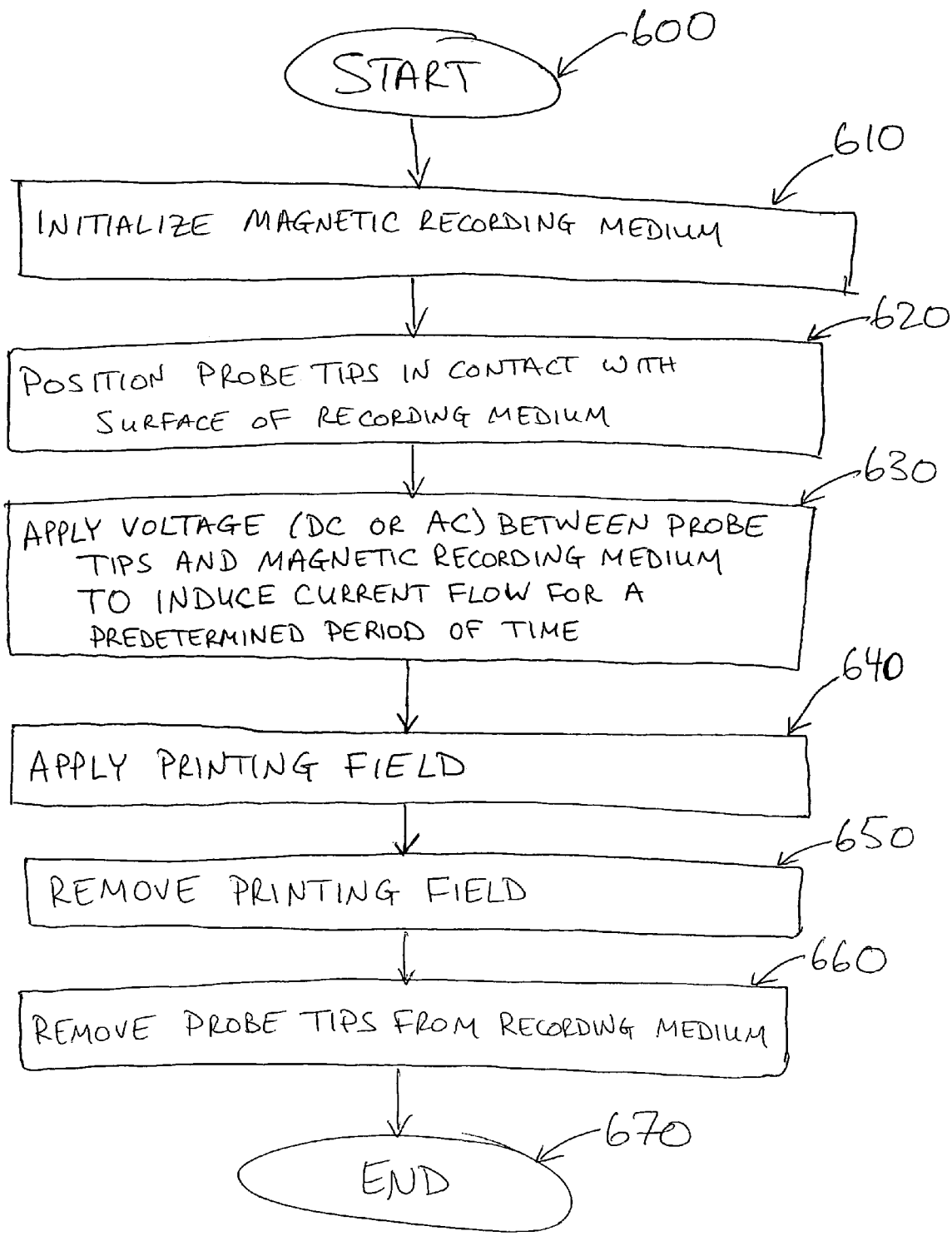
FIG. 6 is a flowchart illustrating a sequence of steps for printing a magnetic pattern using the electrically conductive mask of FIG. 5.

FIG. 6 illustrates a sequence of steps that may be performed for printing a magnetic pattern using the electrically conductive mask 500. The sequence starts at step 600 and proceeds to step 610 where a magnetic recording medium 100 is bulk erased in an initialization direction, e.g., by a strong initializing field $H_{INIT}$ 130. At step 620, the mask is positioned so that its array of probes are placed in contact with the surface of the initialized recording medium. At step 630, a voltage 505 (AC or DC) is applied between the conductive mask 500 and the magnetic recording medium for a predetermined period of time. Then, at step 640, a printing field $H_{PRINT}$ 540 is applied in a direction that is substantially the opposite of the initialization direction.

The applied voltage 505 is preferably one or more pulses that induce a sufficient amount of current at the probes to heat localized regions 530 of the recording medium above a threshold temperature. The threshold temperature corresponds to a temperature at which the coercivity of the magnetic recording medium is reduced to a level that enables the printing field 540 to reverse the magnetization directions in the heated regions 530. The voltage 505 may be applied to all of the probes at substantially the same time or alternatively may be a sequence of voltages that are applied to different subsets of probes in the array. At step 650, the printing field 540 is removed and then the probes 520 are moved away from the recording medium at step 660. The sequence ends at step 670.

Figure 7:
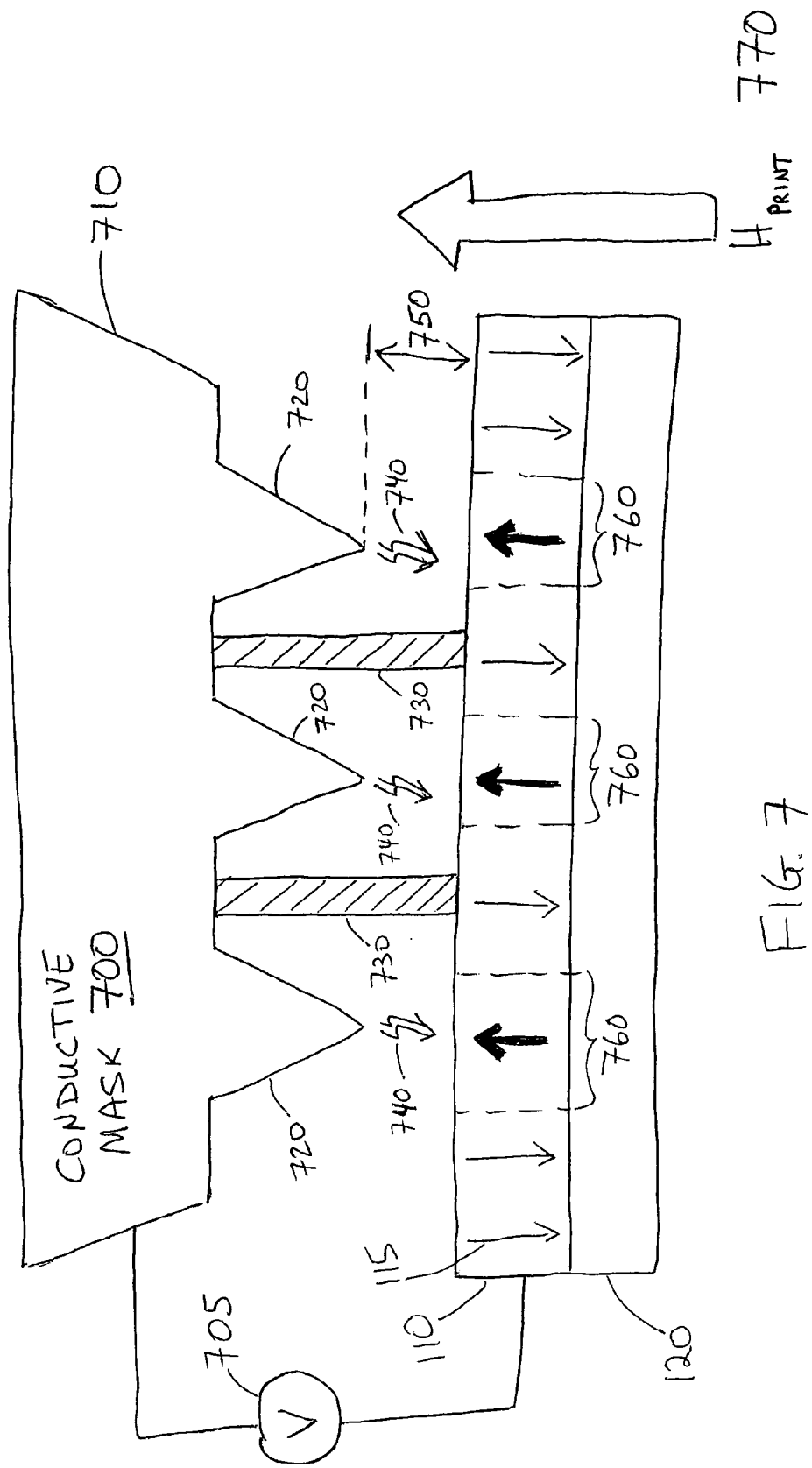
FIG. 7 is a schematic diagram of the exemplary electrically conductive mask used for printing magnetic patterns on a magnetic recording medium in accordance with yet another illustrative embodiment.

FIG. 7 illustrates yet another illustrative embodiment of an exemplary conductive mask 700. Unlike the mask 500 in FIG. 5 that was placed in contact with the magnetic recording layer 110, the conductive mask 700 instead is positioned at a fixed distance 750 away from the surface of the recording layer. To that end, a set of electrically insulating spacers 730 may be used to position the mask above the surface and maintain a substantially constant probe-to-media separation. In some embodiments, the insulating spacers 730 may be permanently affixed to the mask 700, e.g., adhered or otherwise attached to the mask at fixed locations. Alternatively, the insulating spacers 730 may be constructed as one or more separate attachments, which may be placed on the surface of the recording layer 110 and configured to receive the conductive mask 700. In either case, the combined mask and spacer arrangement may have to be aligned with at least one servo sector on the recording layer if the mask is configured to write one or more servo patterns.

After positioning the conductive mask 700 and the insulating spacers 730, a voltage 705 is applied between the mask and the magnetic recording layer to induce field emission currents 740 from the probes 720 to the underlying recording layer 110. The voltage 705 may be applied to all of the probes at substantially the same time or, alternatively, may be sequentially applied to selected subsets of one or more probes. Each probe's field emission current 740 heats a corresponding region 760 of the recording layer above a threshold temperature, e.g., due to Joule heating. At the threshold temperature and above, the heated regions 760 have a reduced coercivity as compared with the coercivity of the recording layer at room temperature. The threshold temperature may be to selected to be above or below the Curie temperature of the magnetic recording layer.

The applied voltage 705 is preferably embodied as one or more voltage pulses whose pulse amplitudes and durations are selected on the order of an electrostatic discharge (ESD) event. In this context, an ESD event corresponds to a rapid transfer of electrostatic charge between conductors at different electrostatic potentials. Accordingly, the induced ESD events generate field emission currents 740 from the probe tips to their respective underlying regions 760 in the recording layer 110. Because the applied voltage pulses induce relatively short ESD events, the field emission currents 740 are able to heat their respective regions 760 above the threshold temperature without physically damaging, e.g., melting or ablating, the recording layer material. Illustratively, each voltage pulse may generate a corresponding probe current of less than approximately 100 milliamperes for a time period on the order of a nanosecond.

A magnetic printing field $H_{PRINT}$ 770 is applied in a direction that is substantially opposite from the initialization direction of the recording layer 110. The strength of the applied field 770 is selected to be greater than the coercivity of the heated regions 720 but less than the coercivity of the recording layer 110 at room temperature. Consequently, only those magnetizations (shown in bold) in the heated regions 760 change direction and align with the applied printing field 770.

Figure 8:
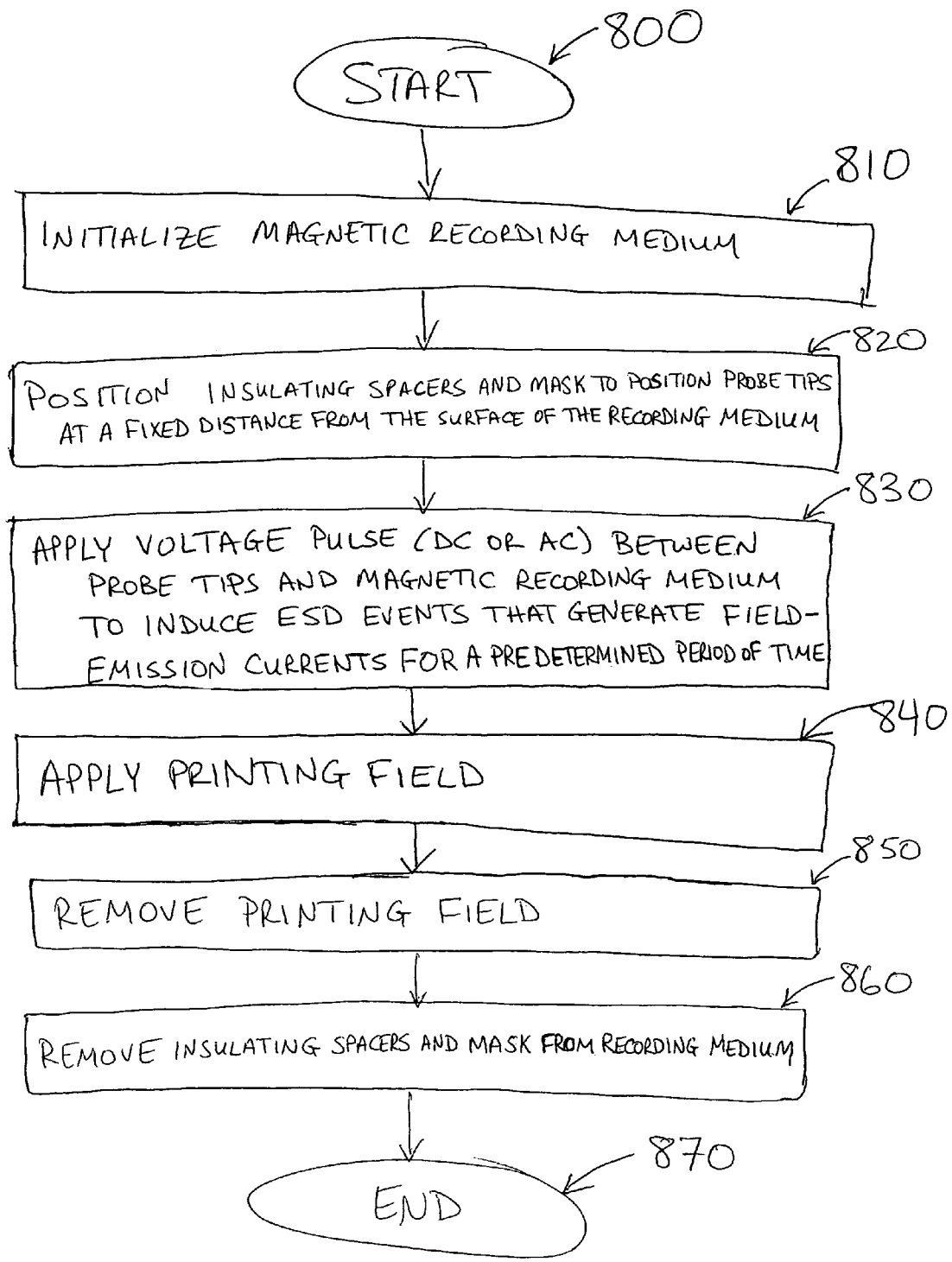
FIG. 8 is a flowchart illustrating a sequence of steps for printing a magnetic pattern using the electrically conductive mask of FIG. 7.

FIG. 8 illustrates a sequence of steps that may be performed for printing a magnetic pattern using the electrically conductive mask 700. The sequence starts at step 800 and proceeds to step 810 where a magnetic recording medium 100 is bulk erased in an initialization direction, e.g., by a strong initializing field $H_{INIT}$ 130. At step 820, a set of insulating spacers 730 are placed in contact with the surface of the initialized recording medium. The conductive mask 700 is mounted on the insulating spacers so that its array of probes are spaced a fixed distance 750 away from the surface of the recording medium. The insulating spacers may be permanently or removably attached to the conductive mask 700. At step 830, a voltage 705 is applied between the conductive mask 700 and the magnetic recording medium to induce ESD events that generate field emission currents 740 for a predetermined period of time. Then, at step 840, a printing field $H_{PRINT}$ 770 is applied in a direction that is substantially the opposite of the initialization direction.

The applied voltage 705 is preferably one or more pulses that induce a sufficient amount of field emission currents to heat localized regions 760 of the recording medium above a threshold temperature. The threshold temperature corresponds to a temperature at which the coercivity of the magnetic recording medium is reduced to a level that enables the printing field 770 to reverse the magnetization directions in the heated regions 760. The voltage 705 may be applied to all of the probes at substantially the same time or alternatively may be a sequence of voltages that are applied to different subsets of probes in the array. At step 850, the printing field 770 is removed and then the probes 720 and insulating spacers 730 are removed at step 860. The sequence ends at step 870.

The foregoing has been a detailed description of illustrative embodiments of the invention. Various modifications and additions can be made without departing from the spirit and scope of the invention. For example, while the illustrative embodiments describe energizing the probes before applying a printing field, those skilled in the art will understand that these steps may be reversed, i.e., the step of applying the printing field may occur before the step of energizing the probes to heat the magnetic recording layer. Accordingly, the illustrative steps 420-440, 620-640 and 820-840 may be performed in various orders without departing from the scope of the inventive teachings herein. Likewise, it is also contemplated that the illustrative steps 450-460, 650-660 and 850-860 may be performed in different orders as well.

Although the voltages 505 and 705 are illustratively applied between the electrically conductive masks 500 and 700 and the magnetic recording layer 110, it is expressly contemplated that, in some embodiments, the voltages alternatively may be applied between the masks and the substrate 120, when the substrate is also constructed of an electrically conductive material. One or more different voltage sources may be employed for generating the applied voltages 505 and 705. In addition, different voltages (e.g., pulse widths and/or amplitudes) may be applied to different probes to offset manufacturing disparities from probe to probe. Likewise, the power of incident laser light 305 also may be selectively adjusted from probe to probe to compensate for structural differences.

In the illustrative embodiments, the array of probes is preferably arranged in a predetermined pattern, such as a servo pattern. More generally, the embodiments described herein may apply to servo-related patterns or other predetermined magnetic patterns that may be printed on a recording medium. Those skilled in the art will appreciate that rather than physically arranging the probes in the predetermined pattern, a regular array of probes instead may be selectively energized to match the predetermined pattern. For instance, the incident light 305 may irradiate only a selected subset of the probes 320 in the optical mask 300, where the selected subset of the probes corresponds to the predetermined pattern. Similarly, the voltages 505 or 705 may be applied to a selected subset of the probes 520 or 720 to induce currents at only those probes situated in the predetermined pattern.

Although the laser light 305 is preferably illuminated through the illustrative optical mask 300, it is also contemplated that non-laser light sources may be employed. More generally, one or more laser and/or non-laser light sources may be used to generate the light 305. Accordingly, this description is meant to be taken only by way of example and not to otherwise limit the scope of the invention.

What is claimed is:

1. A method for printing a magnetic pattern on a magnetic recording medium, the method comprising:
   initializing the magnetic recording medium in an initialization direction;
   positioning a mask having an array of probes with electrically conductive tips of said probes in contact or near-contact with the initialized magnetic recording medium, the array of probes being arranged in the magnetic pattern;
   applying a sufficient voltage between the magnetic recording medium and at least some probes in the array to heat their respective contacted or near-contacted regions of the magnetic recording medium above a threshold temperature without physically damaging the magnetic recording medium;
   applying a magnetic field in a direction that is substantially the opposite of the initialization direction, the magnetic field reversing magnetization directions in the heated regions of the magnetic recording medium; and
   removing the mask of probes from the magnetic recording medium.

2. The method of claim 1, wherein the magnetic pattern includes one or more servo-related patterns.

3. The method of claim 1, wherein the at least some probes contact the magnetic recording medium and the applied sufficient voltage generates direct or alternating currents (DC or AC) between the at least some probes and the magnetic recording medium.

4. The method of claim 1, wherein the at least some probes are separated from the magnetic recording medium and the applied sufficient voltage generates field emission currents between the at least some probes and the magnetic recording medium.

5. The method of claim 4, further comprising:
   positioning one or more insulating spacers between the array of probes and the magnetic recording medium, the insulating spacers ensuring that the array of probes does not contact the magnetic recording medium.

6. The method of claim 5, wherein the insulating spacers and the array of probes are components of a mask.

7. The method of claim 1, wherein the applied sufficient voltage includes one or more voltage pulses.

8. The method of claim 1, further comprising:
   applying the sufficient voltage to the at least some probes at substantially the same time.

9. The method for printing a magnetic pattern as defined in claim 1 wherein said mask having an array of probes is used to write a plurality of magnetic domains at substantially the same time.

10. The method for printing a magnetic pattern as defined in claim 1, wherein said probe tips are fabricated to print high resolution magnetic patterns.

11. The method of claim 1, wherein the sufficient voltage includes one or more voltage pulses each having a duration of less than one nanosecond.

12. The method of claim 1, wherein the sufficient voltage includes one or more voltage pulses and an electrical current of less than 100 milliamperes is transmitted through the probe during each of the one or more voltage pulses.

13. An apparatus for printing a magnetic pattern on a magnetic recording medium, the apparatus comprising:
   a voltage source;
   a base portion; and
   a mask having an array of probes arranged in the magnetic pattern, each probe in the array having an electrically conductive tip coupled to the voltage source and being adapted to heat a respective region of the magnetic recording medium above a threshold temperature without physically damaging the medium by applying a sufficient voltage between the electrically conductive tip of each probe and the magnetic recording medium.

14. The apparatus of claim 13, wherein the base portion and the array of probes are fabricated from the same material.

15. The apparatus of claim 14, wherein the array of probes is formed on the base portion using electron beam lithography.

16. The apparatus of claim 13, wherein the base portion and the array of probes are constructed of an electrically conductive material and each probe heats its respective region of the magnetic recording medium in response to an applied voltage.

17. The apparatus as defined in claim 16 wherein said applied sufficient voltage is one of either a constant voltage or a time varying voltage, to induce either direct or alternating currents through the probes, respectively.

18. The apparatus as defined in claim 16 wherein said applied sufficient voltage induces electrostatic discharge events that generate field-emission currents from the probes to the recording layer to heat corresponding portions of said recording layer.

19. A method for printing a magnetic pattern on a magnetic recording medium, the method comprising:
   initializing the magnetic recording medium in an initialization direction;
   positioning a mask having an array of probes with electrically conductive tips of the probes in contact or near-contact with the initialized magnetic recording medium;
   applying a sufficient voltage between the magnetic recording medium and at least some probes in the array to heat their respective contacted or near-contacted regions of the magnetic recording medium above a threshold temperature without physically damaging the magnetic recording medium, the arrangement of energized probes corresponding to the magnetic pattern;
   applying a magnetic field in a direction that is substantially the opposite of the initialization direction, the magnetic field reversing magnetization directions in the heated regions of the magnetic recording medium; and
   removing the mask of probes from the magnetic recording medium.

20. The method of claim 19, wherein the sufficient voltage includes one or more voltage pulses.

21. An apparatus for printing a magnetic pattern on a magnetic recording medium, the apparatus comprising:
   a voltage source;
   a base portion;
   a mask having an array of probes arranged in the magnetic pattern, the probes being constructed of an electrically conductive material, the tips of the probes being positioned a fixed distance away from a surface of the recording layer; and
   a set of insulating spacers positioned between the array of probes and a surface of the recording medium to maintain a substantially constant probe tip-to-media separation, and each probe in the array being adapted to heat a respective region of the magnetic recording medium above a threshold temperature without physically damaging the medium by applying a sufficient voltage between the electrically conductive tip of each probe and the magnetic recording medium in response to an applied voltage by inducing electrostatic discharge events that generate field emission currents for a predetermined period of time.

22. The apparatus of claim 21, wherein the sufficient voltage includes one or more voltage pulses each having a duration of less than one nanosecond.

23. The apparatus of claim 21, wherein the sufficient voltage includes one or more voltage pulses and an electrical current of less than 100 milliamperes is transmitted through the probe during each of the one or more voltage pulses.

\* \* \* \* \*